United States Patent
Nair et al.

(10) Patent No.: US 10,995,683 B2
(45) Date of Patent: May 4, 2021

(54) ACOUSTIC KNOCK DETECTION IN DUAL-FUEL ENGINES

(71) Applicant: WOODWARD, INC., Fort Collins, CO (US)

(72) Inventors: Suraj Nair, Fort Collins, CO (US); Jason Barta, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 238 days.

(21) Appl. No.: 15/967,150

(22) Filed: Apr. 30, 2018

(65) Prior Publication Data
US 2019/0331034 A1 Oct. 31, 2019

(51) Int. Cl.
*F02D 19/06* (2006.01)
*F02D 41/00* (2006.01)
*F02D 41/14* (2006.01)

(52) U.S. Cl.
CPC ..... *F02D 19/0647* (2013.01); *F02D 41/0027* (2013.01); *F02D 41/1498* (2013.01)

(58) Field of Classification Search
CPC combination set(s) only.
See application file for complete search history.

(56) References Cited

U.S. PATENT DOCUMENTS

| | | | |
|---|---|---|---|
| 7,181,339 B2 | 2/2007 | Remelman | |
| 7,377,255 B2 * | 5/2008 | Miyashita | G01L 23/225 123/305 |
| 2006/0144365 A1 | 7/2006 | Miyashita | |
| 2007/0125321 A1 | 6/2007 | Ritter | |

FOREIGN PATENT DOCUMENTS

| | | | |
|---|---|---|---|
| EP | 1923556 | | 5/2008 |
| GB | 2479567 A | * | 4/2010 |
| GB | 2479567 | | 10/2011 |
| KR | 20140132827 | | 11/2014 |
| WO | WO2017112967 | | 7/2017 |

OTHER PUBLICATIONS

PCT International Search Report and Written Opinion in International Application No. PCT/US2019/029889, dated Aug. 8, 2019, 14 pages.
PCT International Preliminary Report on Patentability in International Appln. No. PCT/US2019/029889, dated Nov. 3, 2020, 9 pages.

* cited by examiner

*Primary Examiner* — Kevin A Lathers
(74) *Attorney, Agent, or Firm* — Fish & Richardson P.C.

(57) ABSTRACT

The subject matter of this specification can be embodied in, among other things, a method that includes determining a gas supplement ratio (GSR) of a mixture of natural gas and diesel, identifying a start event of a stroke of a piston of a combustion cylinder of a dual-fuel engine, identifying a first observation period that is offset from the start event based on the GSR, identifying a second observation period based on the GSR, receiving signals representative of vibration of the combustion cylinder during the stroke, identifying an abnormal combustion event based on the signals, determining that abnormal combustion occurred during at least one of the first observation period and the second observation period, and causing a change in operation of the engine based determining that abnormal combustion occurred during at least one of the first observation period and the second observation period.

20 Claims, 5 Drawing Sheets

ACOUSTIC KNOCK DETECTION IN DUAL-FUEL ENGINES

TECHNICAL FIELD

This instant specification relates to engine control systems.

BACKGROUND

Diesel engines and gasoline engines can both exhibit abnormal combustion during operation, commonly referred to as engine knock or detonation, which is usually accompanied by a characteristic sound. Uncontrolled, damaging combustion such as engine knock, in which a large amount of energy is released in a short period of time, typically from rapid combustion of end gas, creates rapid pressure rise rates often followed by high frequency pressure oscillations. These intense pressure waves impose high stresses on engine structural components and dramatically increase heat transfer rates, ultimately leading to engine damage. Such uncontrolled combustion may occur due to a variety of reasons such as poor fuel quality and properties, inhomogeneity of fuel-air mixture, hot spots in the combustion chamber, deposits, evaporating lube oil, unfavorable pressure-time history in the unburned gas of the cylinder charge, cylinder or cyclic variability of charge, inadequate cooling, etc. Prediction of abnormal combustion is generally very difficult and is typically addressed during engine design.

Many types of fuel can produce different types of abnormal combustion. In the case of diesel engines, engine knock is more or less unavoidable since fuel is injected into highly compressed air towards the end of the compression stroke. As such, diesel engines are designed to withstand knock that is typical for diesel fuel operation. Use of other fuels in an engine designed to use diesel can result in abnormal combustion and knock that the diesel engine was not designed to tolerate.

SUMMARY

In general, this document describes engine control systems. More specifically, this document describes engine control systems for dual-fuel engines configured to operate using mixtures of diesel fuel and combustible gases (e.g., natural gas).

In a first aspect, a method for acoustic detection of knock in a dual-fuel engine includes determining a gas supplement ratio (GSR) of a mixture of combustible natural gas and diesel fuel, identifying an occurrence of a predetermined start event of a predetermined stroke of a piston of a selected combustion cylinder of the dual-fuel engine, identifying a first observation period that is offset from the occurrence of the predetermined start event, based on the GSR, identifying a second observation period that is offset from the occurrence of the predetermined start event, based on the GSR, and at least partly non-overlapping from the first observation period, receiving signals, provided by a vibration sensor, representative of vibration of the selected combustion cylinder during the predetermined stroke, identifying an abnormal combustion event based on the signals, determining that the abnormal combustion event occurred during at least one of the first observation period and the second observation period, and causing a change in operation of the dual-fuel engine based determining that the abnormal combustion event occurred during at least one of the first observation period and the second observation period.

Various implementations can include some, all, or none of the following features. The predetermined start event can be based on a piston of the selected combustion cylinder reaching top dead center of a predetermined offset from top dead center. The first observation period can have a start that is offset from the predetermined start event by a first predetermined number of engine crank angle degrees and an end that is offset from the predetermined start event by a second predetermined number of engine crank angle degrees, and the second observation period can have a start that is offset from the predetermined start event by a third predetermined number of engine crank angle degrees and an end that is offset from the predetermined start event by a fourth predetermined number of engine crank angle degrees. The first observation period can have a start that is offset from the predetermined start event by a first predetermined amount of time and an end that is offset from the predetermined start event by a second predetermined amount of time, and the second observation period can have a start that is offset from the predetermined start event by a third predetermined amount of time and an end that is offset from the predetermined start event by a fourth predetermined amount of time. The method can also include providing at least one of a first indicator signal indicative of abnormal combustion of combustible natural gas, and a second indicator signal indicative of abnormal combustion of diesel fuel. Determining that the abnormal combustion event occurred during at least one of the first observation period and the second observation period can include at least one of determining, during the first observation period, that the abnormal combustion event occurred during the first observation period, and determining, during the second observation period, that the abnormal combustion event occurred during the second observation period. Determining that the abnormal combustion event occurred during at least one of the first observation period and the second observation period can include at least one of determining occurrence of the abnormal combustion event after the first observation period, that the abnormal combustion event occurred during the first observation period, and determining, after the second observation period, that the abnormal combustion event occurred during the second observation period. At least one of identifying the first observation period and identifying the second observation period can include performing a table lookup, based on the GSR, on a table of predetermined observation period values. At least one of identifying the first observation period and identifying the second observation period can be based on the GSR and at least one of a determined engine load and a determined number of engine revolution speed.

In a second aspect, an acoustic knock detection system includes a vibration sensor, a data processing apparatus, and a computer memory storage device storing instructions executable by a computer device and that upon such execution cause the computer device to perform operations including determining a gas supplement ratio (GSR) of a mixture of combustible natural gas and diesel fuel, identifying an occurrence of a predetermined start event of a predetermined stroke of a piston of a selected combustion cylinder of a dual-fuel engine, identifying a first observation period that is offset from the occurrence of the predetermined start event, based on the GSR, identifying a second observation period that is offset from the occurrence of the predetermined start event, based on the GSR, and at least partly non-overlapping from the first observation period, receiving signals, provided by the vibration sensor, representative of vibration of the selected combustion cylinder of the dual-fuel engine during the predetermined stroke, identifying an abnormal combustion event based on the signals, determining that the abnormal combustion event occurred during at least one of the first observation period and the second observation period, and causing a change in operation of the dual-fuel engine based determining that the abnormal combustion event occurred during at least one of the first observation period and the second observation period.

Various embodiments can include some, all, or none of the following features. The acoustic knock detection system can include the dual-fuel engine. The acoustic knock detection system can include a second vibration sensor, wherein the operations can also include identifying an occurrence of a second predetermined start event of a predetermined stroke of a second piston of a second selected combustion cylinder of the dual-fuel engine, identifying a third observation period that is offset from the occurrence of the second predetermined start event, based on the GSR, identifying a fourth observation period that is offset from the occurrence of the second predetermined start event, based on the GSR, and at least partly non-overlapping from the third observation period, receiving second signals, provided by the second vibration sensor, representative of vibration of the second selected combustion cylinder of the dual-fuel engine during the predetermined stroke, identifying a second abnormal combustion event based on the second signals, determining that the second abnormal combustion event occurred during at least one of the third observation period and the fourth observation period, and causing a second change in the operation of the dual-fuel engine based determining that the second abnormal combustion event occurred during at least one of the third observation period and the fourth observation period. The predetermined start event can be based on a piston of the selected combustion cylinder reaching top dead center of a predetermined offset from top dead center. The first observation period can have a start that is offset from the predetermined start event by a first predetermined number of engine crank angle degrees and an end that is offset from the predetermined start event by a second predetermined number of engine crank angle degrees, and the second observation period can have a start that is offset from the predetermined start event by a third predetermined number of engine crank angle degrees and an end that is offset from the predetermined start event by a fourth predetermined number of engine crank angle degrees. The first observation period can have a start that is offset from the predetermined start event by a first predetermined amount of time and an end that is offset from the predetermined start event by a second predetermined amount of time, and the second observation period can have a start that is offset from the predetermined start event by a third predetermined amount of time and an end that is offset from the predetermined start event by a fourth predetermined amount of time. The operations can include providing at least one of a first indicator signal indicative of abnormal combustion of combustible natural gas, and a second indicator signal indicative of abnormal combustion of diesel fuel. Determining that the abnormal combustion event occurred during at least one of the first observation period and the second observation period can include at least one of determining, during the first observation period, that the abnormal combustion event occurred during the first observation period, and determining, during the second observation period, that the abnormal combustion event occurred during the second observation period. Determining that the abnormal combustion event occurred during at least one of the first observation period and the second observation period can include at least one of determining the occurrence of the abnormal combustion event after the first observation period, that the abnormal combustion event occurred during the first observation period, and determining, after the second observation period, that the abnormal combustion event occurred during the second observation period. At least one of identifying the first observation period and identifying the second observation period can include performing a table lookup, based on the GSR, on a table of predetermined observation period values. At least one of identifying the first observation period and identifying the second observation period can be based on the GSR and at least one of a determined engine load and a determined number of engine revolution speed.

The systems and techniques described here may provide one or more of the following advantages. First, a system can provide control to permit operation of a diesel and natural gas dual-fuel engine. Second, the system can protect the engine from engine knock and engine damage that can result. Third, the system can provide the safeguards to permit engine operation across a wide range of gas substitution ratios. Fourth, the system can detect knock on a per-cylinder basis in multi-cylinder engines. Fifth, the system can permit a diesel engine to operate safely on at least a partial mixture of combustible gas such as natural gas. Sixth, by permitting the safe use of natural gas, the system can permit the diesel engine to conserve diesel fuel in remote areas by operating based at least partly on locally sourced natural gas instead of remotely transported diesel fuel. Seventh, by permitting the safe use of natural gas, the system can reduce harmful soot, smoke, particulate matter, nitrogen oxides (NOx), carbon dioxide (CO2) and sulfur oxide (SOx) emissions. Eighth, the system can enable an engine to operate safely on various types of fuels and/or fuel qualities.

The details of one or more implementations are set forth in the accompanying drawings and the description below. Other features and advantages will be apparent from the description and drawings, and from the claims.

DETAILED DESCRIPTION

Figure 1:
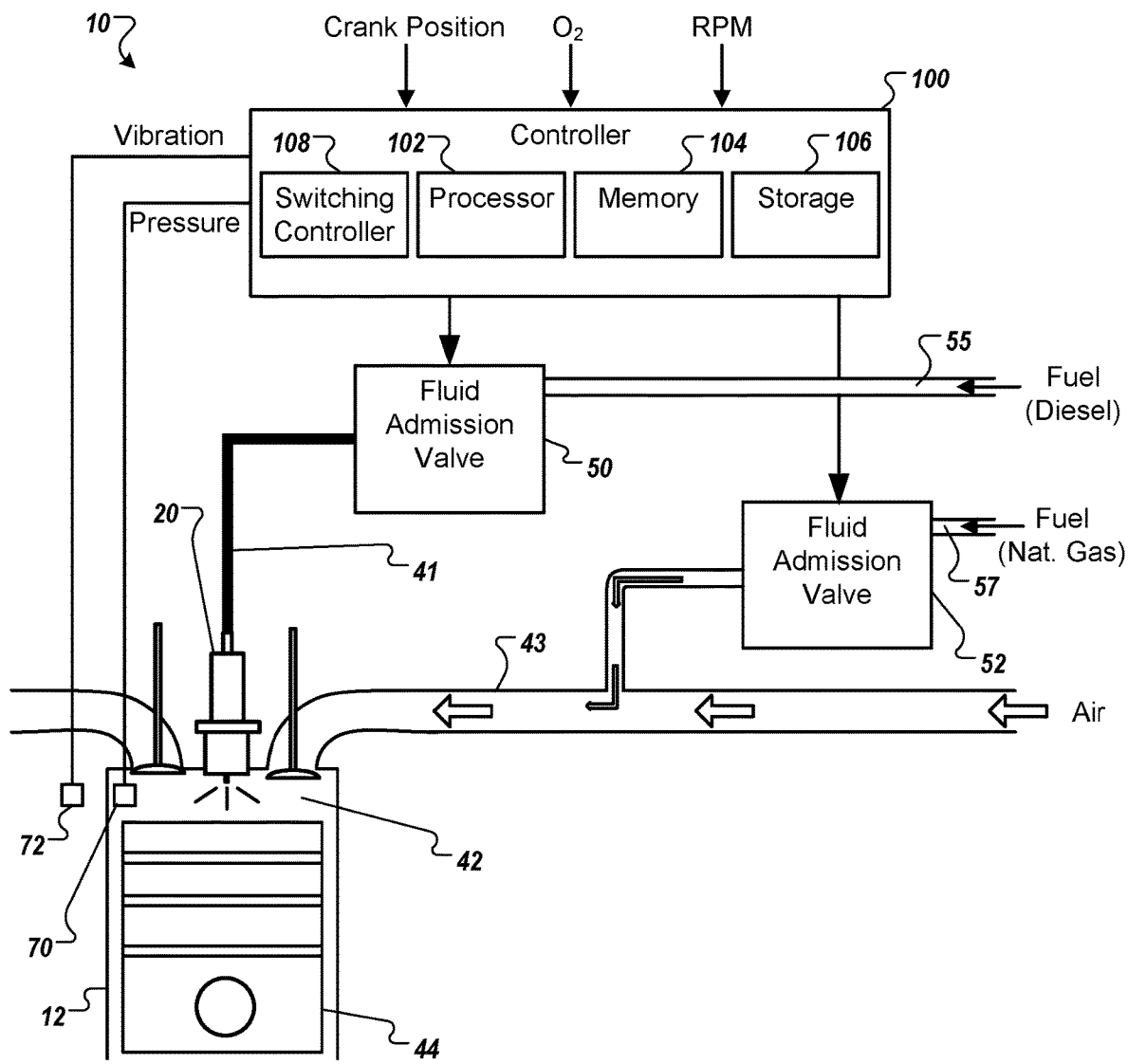
FIG. 1 is a schematic diagram that shows an example fluid admission system.

This document describes systems and techniques for engine system control of dual-fuel engines. More specifically, systems and techniques for the identification of abnormal combustion (e.g., knock, detonation) in engines that operate using various mixture ratios of diesel fuel (e.g., or other fuels with high cetane numbers such as heavy fuel oil, heavy distillate fuels, biodiesel, jet fuel, kerosene, or combinations of these and/or other appropriate fuels) and combustible gas, such as natural gas (e.g., or any appropriate methane, propane, or butane based gasses with high octane numbers, such as liquefied natural gas (LNG), compressed natural gas (CNG), liquefied propane gas (LPG), gasoline, methanol, ethanol, hydrogen, syngas, landfill gas, any kind of biogas, or combinations of these and/or other appropriate fuels).

In general, the normal combustion cycle of a diesel engine produces vibrations that are characteristic of knock. In other words, certain amounts of "knocking" are simply accepted being a part of diesel engine operation, and the engine is designed to tolerate them. In some designs, acoustic or other forms of vibration sensors are used to monitor engines for vibration and/or sounds that result from diesel combustion and detect when an abnormal combustion event occurs (e.g., knock that is severe enough to exceed the amount of "normal" knocking that the engine was designed for, a true knock even by diesel engine standards). Typically, a pressure or vibration sensor is used to monitor an entire compression stroke, and if an abnormal combustion event creates sufficient vibration or pressure to exceed a predetermined knock threshold, the sensor and associated electronics register a "knock".

Diesel engines can be operated by replacing at least a portion of their diesel fuel mixture with one or more other fuels. Combustible gasses, such as natural gas, for example, can be mixed in as a partial replacement for a portion of the diesel fuel and burned during the combustion cycle. The measure of the amount of gas that is used in place of diesel fuel is referred to as the gas substitution ratio (GSR). GSR can be measured in several different ways, such as by percent of mass, percent of energy (e.g., BTUs), or percent volume. For example, an engine in which 10% of the diesel fuel has been replaced by natural gas can be described as having a 10% GSR. In another example, a U.S. gallon of diesel fuel can have an energy equivalent of 139000 BTUs, and a 10% GSR can mean that a 13900 BTU volume of diesel has been replaced by a 13900 BTU volume of natural gas.

Natural gas, however, exhibits its own ability to cause knock, and traditional knock detection systems for diesel engines typically cannot tell the difference between diesel knock and gas knock during a complete combustion stroke. Furthermore, the reactivity of natural gas as a fuel can be difficult to predict, since the "pipeline quality" of the fuel can vary from day to day and/or region to region depending on the amounts of ethane and propane in the gas. For example, the composition can vary from nearly 100 percent methane, which has a relatively higher resistance to engine knock, to less than 60 percent methane, which has a relatively higher propensity for engine knock. As such, some of such traditional systems can exhibit poor performance by limiting the allowable GSR by over-detecting gas-related knock (and lowering the GSR to compensate) or by inadequately protecting the engine from knock-related damage by under-detecting gas-related knock. For example, traditional systems are typically limited to using 50%-60% GSR at most.

In general, the systems and processes described below provide ways to operate dual-fuel (e.g., gas/diesel) engines with relatively higher gas substitution ratios, ranging from about 0% up to about 98% GSR, but typically operating in a range of about 70% to about 80% GSR. Combustible gas and diesel fuel can both exhibit knock, but they tend to do it at different points during the combustion stroke, and the timing and characteristics of the knocks can be different based on a number of variables including the GSR. As will be described in more detail below, gas knock can be distinguished from diesel knock by using a vibration sensor to monitor vibration during the combustion stroke, dividing the combustion stroke into sub-periods, and determining if a knock happened during one of those sub-periods. The sub-period in which the knock occurs can be indicative of whether the knock was a gas knock or a diesel knock, and an engine controller can take appropriate action as a result in order to prevent engine damage without needlessly reducing GSR or risking excessive engine damage or wear.

FIG. 1 is a schematic diagram that shows an example fluid (e.g., fuel) admission system 10 for a reciprocating engine. In some implementations, the system 10 can be used for determining abnormal combustion or knock in a cylinder of the engine, such as the cylinder 12.

An actuator controller 100, such as an Engine Control Module (ECM), is a hysteretic current or voltage controller used to control the actuation of a fluid admission valve 50 and a fluid admission valve 52. The fluid admission valve 50 is actuated by the controller 100 to control the flow of diesel fuel or other appropriate liquid fuel from a fuel conduit 55 to a fuel conduit 41. The fluid admission valve 52 is actuated by the controller 100 to control the flow of combustible natural gas or other appropriate gaseous fuel (e.g., propane, hydrogen) from a fuel conduit 57 to an air intake 43. By controlling the fluid admission valves 50 and 52, the controller 100 can control the relative amounts of combustible natural gas and diesel fuel that are supplied to the fuel conduit 41 and the air intake 43. In other words, the controller 100 can control the fluid admission valves 50 and 52 so the fuel mixture provided to the cylinder 12 has a controlled, predetermined GSR.

The controller 100 also controls actuation of a fluid injector 20. The fluid injector 20 operates when a current is applied to from the controller 100, thus allowing pressurized fluid to spray from the fuel conduit 41 into a combustion chamber 42. In a diesel cycle, the combustion stroke begins when a piston 44 is near top dead center (TDC) and begins moving downward. The controller 100 causes the fluid injector 20 to spray fuel from the fuel conduit 41 into compressed and heated air within the combustion chamber 42. The heat of the compressed air causes the fuel to ignite and burn, and the combustion of the fuel with the compressed air drives the piston 44 downward.

Combustion of fuel (e.g., diesel or diesel with a mix of natural gas) generates both pressure within the cylinder 12 and vibration (e.g., sound) from the cylinder 12. Pressure within the cylinder 12 is sensed by a pressure sensor 70, and pressure signals from the pressure sensor 70 are read and processed by the controller 100. Vibration of the cylinder 12 is sensed by a vibration sensor 72 (e.g., accelerometer, microphone), and vibration signals from the vibration sensor 72 are read and processed by the controller 100.

Abnormal combustion, such as the kind that causes engine knock, results in relatively more rapid and/or intense changes in pressure and vibration than nominal combustion. As such, abnormal combustion events can cause identifiable signal patterns within the pressure and/or vibration signals measured by the pressure sensor 70 and/or the vibration sensor 72. The controller 100 can process the sensor signals to identify that an abnormal combustion event has occurred.

In a diesel engine, however, diesel combustion exhibits pressure and vibration characteristics of engine knock even under "normal" combustion circumstances. The timing of the combustion timing of diesel and natural gas components of a dual-fuel mixture can vary based on a number of factors, including GSR, engine load, available oxygen (e.g., $O_2$, elevation), engine speed (RPMs), temperature, fuel quality, compression ratio, and any other appropriate variable of dual-fuel engine combustion. The concept of multiple combustion periods will be discussed further in the descriptions of FIGS. 2-5.

As such, the controller 100 is configured to differentiate among normal diesel combustion, normal natural gas combustion, diesel knock, and natural gas knock, by leveraging the knowledge that the two components of a dual-fuel mixture (e.g., diesel and natural gas) combust during two slightly different periods during the combustion stroke, based on one or more measured variables such as GSR, engine load, available oxygen (e.g., O2, elevation), engine speed (RPMs), temperature, fuel quality, compression ratio, and any other appropriate variable of dual-fuel engine combustion.

During the combustion stroke, the controller 100 identifies a starting event such as TDC or a crank offset from TDC based on an engine crank sensor, or based on actuation of the fluid injector 21. For example, diesel injection can be expected to start at about 5 degrees before TDC. The starting event serves as a point of reference for the relative timing and identification of the diesel combustion period and the natural gas combustion period, within which knocking may be detected and identified by the controller 100 as being diesel and/or gas knock. The controller 100 is configured to take remedial measures to prevent engine damage when engine knock is identified (e.g., reduce the GSR, reduce engine load, alter fuel injection timing). The controller 100 can also be configured to take other steps in the absence of detected engine knock. For example, the controller 100 may increase the GSR and/or alter fuel injection to economize the consumption of diesel fuel by the engine.

The controller 100 can be used for the operations described herein according to one implementation. The controller 100 includes a processor 102, a memory 104, a storage device 106, and switching controller 108. The processor 102 is capable of processing instructions for execution within the system 100. In one implementation, the processor 102 can be a field-programmable gate array (FPGA) processor. For example, with the advent of very fast FPGAs, it is possible to look carefully at the switching controller 108 logic and detect very small variations in current and voltage waveforms at very fast clock rates.

In another implementation, the processor 102 can be a single-threaded processor. In another implementation, the processor 102 can be a multi-threaded processor. In some implementations, the processor 102 can be capable of processing instructions stored in the memory 104 or on the storage device 106 to collect information from, and provide control signals to, the fluid injector 20.

The memory 104 stores information within the controller 100. In some implementations, the memory 104 can be a computer-readable medium. In some implementations, the memory 104 can be a volatile memory unit. In some implementations, the memory 104 can be a non-volatile memory unit.

The storage device 106 is capable of providing mass storage for the system 100. In one implementation, the storage device 106 is a computer-readable medium. In various different implementations, the storage device 106 may be non-volatile information storage unit (e.g., FLASH memory).

The switching controller 108 provides control signal output operations for the controller 100. The switching controller 108 provides actuation control signals (e.g., pulse width modulated, PWM, driver signals) that activate the fluid injector 20, the fluid admission valve 50, and the fluid admission valve 52. For example, the switching controller 108 can include field effect transistors (FETs) or other switching devices that can convert a logic-level signal from the processor 102 to a current and/or voltage waveform with sufficient power to drive a solenoid coil of the fluid injector 20. In another implementation, the switching controller 108 can provide digital or analog signals configured to control servo valves within the fluid admission valve 50 and/or 52.

The features described herein can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

Figure 2:
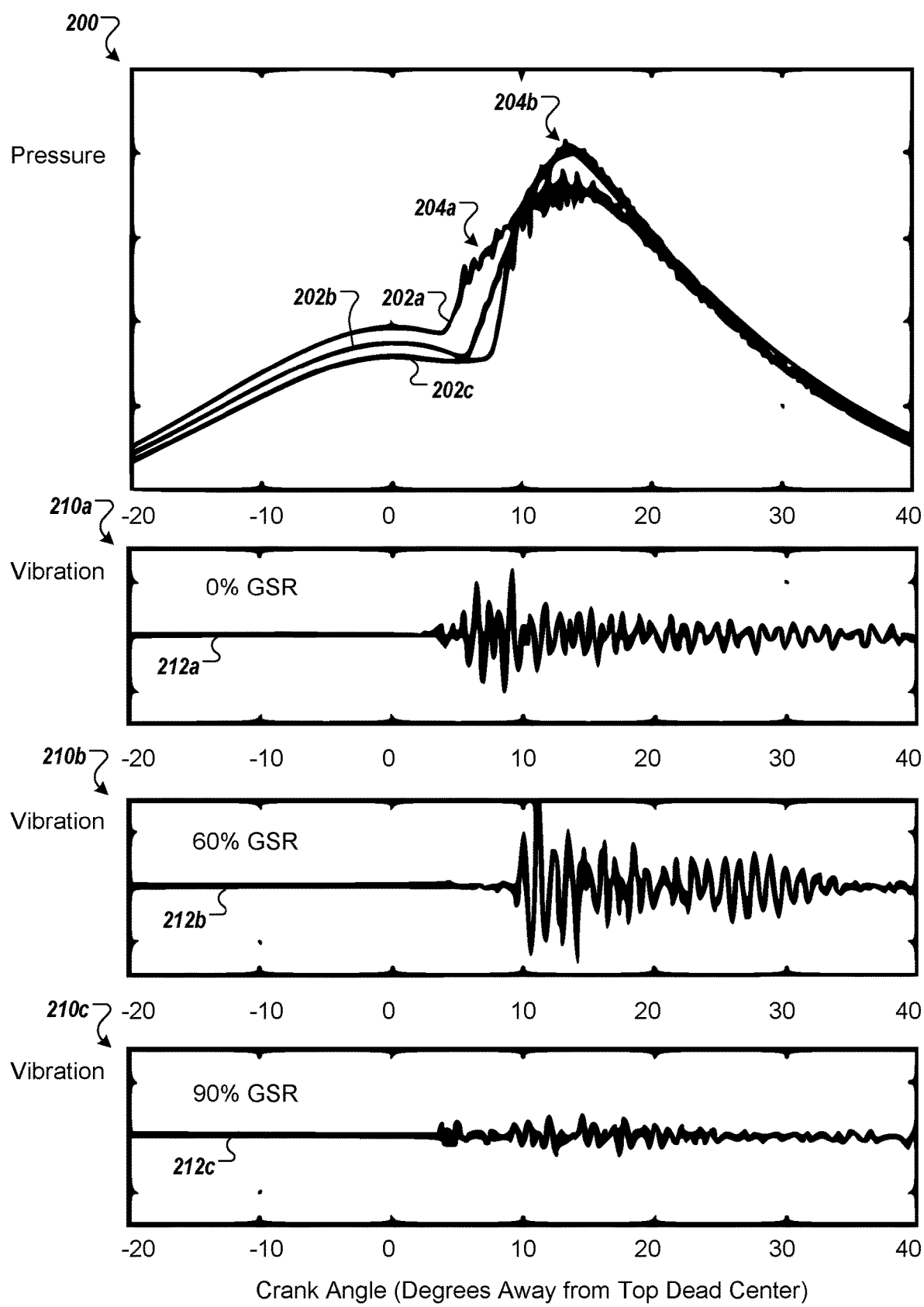
FIG. 2 is a collection of charts that show example cylinder pressures and vibration levels for combustion at various example gas substitution ratios.

FIG. 2 is a collection of charts that show example cylinder pressures and vibration levels for combustion at various example gas substitution ratios. A chart 200 shows cylinder pressure relative to crank angle in degrees away from top dead center for three example combustion strokes. An example combustion stroke data set 202a represents an example of pressure over stroke for a combustion cycle using 0% GSR. An example combustion stroke data set 202b represents an example of pressure over stroke for a combustion cycle using 60% GSR. An example combustion stroke data set 202c represents an example of pressure over stroke for a combustion cycle using 90% GSR. As can be seen from the example data sets 202a-202c, the timing and amplitude of cylinder pressure can vary based on the GSR.

Engine knock can introduce a relatively higher-frequency component to the waveforms, such as a pressure ripple 204a and a pressure ripple 204b (e.g., pressure oscillations, fluctuations, pulsations). In some implementations, the data sets 202a-202c may represent pressure signals from the example pressure sensor 70 of FIG. 1, as measured by the controller 100. In some applications, pressure sensors may be used, but sensor lifespan, availability of optimal sensor placement locations, and/or sensor cost can make their use difficult or prohibitive. Vibration sensors and/or accelerometers, by contrast, can provide a more flexible and/or economical alternative to the use of pressure sensors.

A chart 210a shows vibration relative to crank angle in degrees away from TDC. An example combustion stroke data set 212a represents an example of pressure over stroke for a combustion cycle using 0% GSR. A chart 210b shows vibration relative to crank angle in degrees away from TDC. An example combustion stroke data set 212b represents an example of pressure over stroke for a combustion cycle using 60% GSR. A chart 210c shows vibration relative to crank angle in degrees away from TDC. An example combustion stroke data set 212c represents an example of pressure over stroke for a combustion cycle using 90% GSR. In some implementations, the data sets 212a-212c may represent vibration signals from the example vibration sensor 72 of FIG. 1, as measured by the controller 100.

As can be seen from the example data sets 212a-212c, the timing and amplitude of cylinder vibration can vary based on the GSR. In general, normal combustion can exhibit relatively smoother (e.g., lower amplitude, lower frequency) vibration signals, and abnormal combustion such as knocking can exhibit relatively noisier (e.g., higher amplitude, higher frequency) vibration signals. However, as mentioned previously and as shown by the example combustion stroke data set 212a, diesel combustion exhibits vibration characteristics that resemble engine knock even during normal combustion cycles. The GSR can also alter the delay after which pilot fuel ignition occurs.

Figure 3:
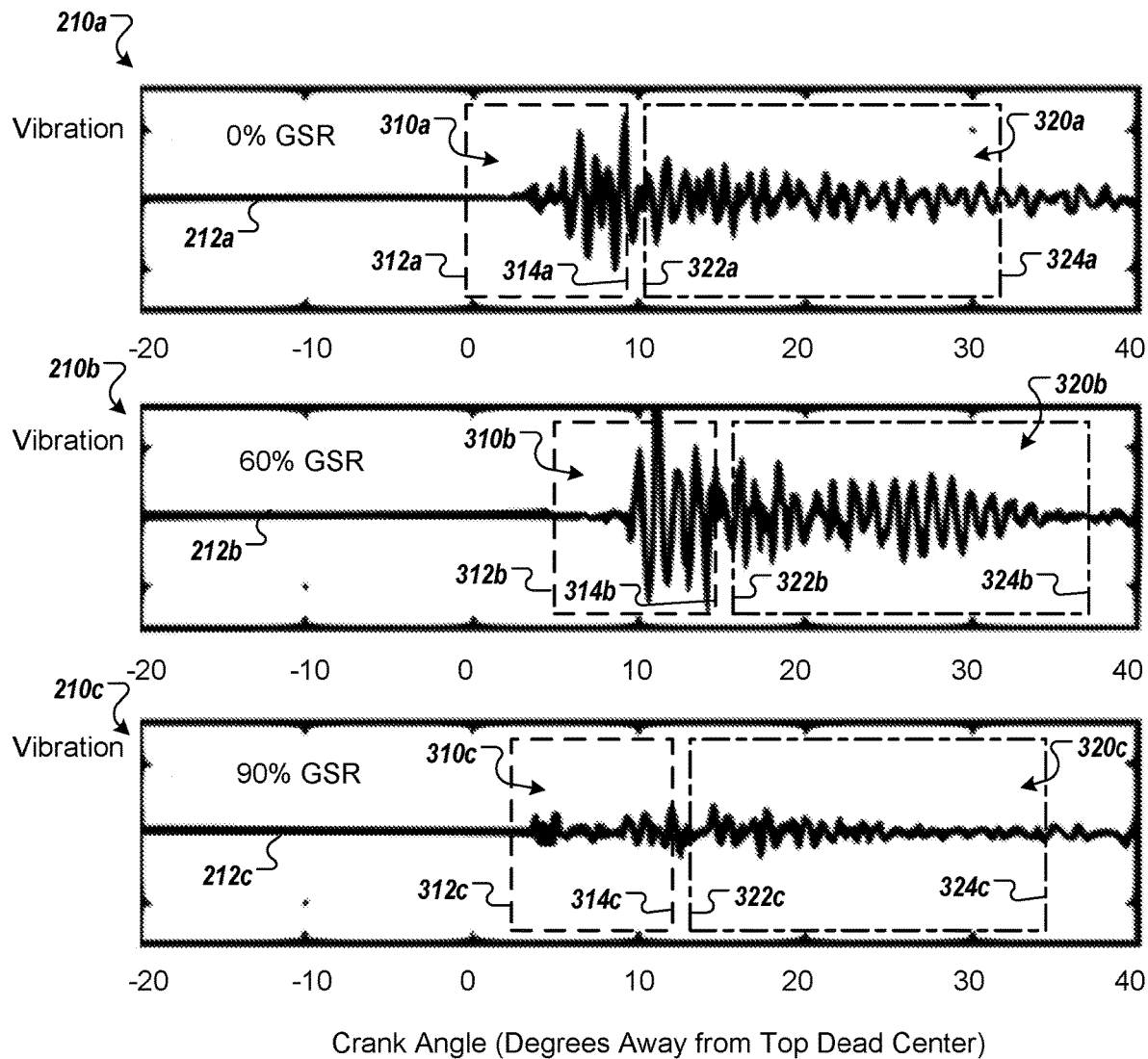
FIG. 3 shows the example vibration charts of FIG. 2, overlaid with example observation windows.

FIG. 3 shows the example vibration charts 210a-210c of FIG. 2, overlaid with example observation windows. During a dual-fuel combustion cycle, the diesel fuel will generally combust first and act as a pilot for ignition of the combustible natural gas. The diesel fuel and natural gas can also burn at different rates after ignition. Since knock is generally associated with the combustion of end gases, and the end gasses can be produced at different times depending on the GSR, the end gases and the potential windows of likelihood of engine knock can vary based on GSR. At 0% gas (100% diesel) operation, the pressure ripple (diesel combustion) is visible in 210a. As the gas is increased from 0 to 30% GSR (not shown), the overall combustion initially becomes quieter, where diesel combustion is still dominant. Further increase to 60% (210b) shows a zone of noisier diesel-gas combustion, with increased knock frequency components detected with both vibration and in-cylinder pressure sensors. This can be seen in 210b where the pressure and vibration knock intensity reach a maximum at 60% GSR. At 90% GSR, the vibration signal is at its quietest (210c). As the gas substitution was increased from 60% to 90% gas substitution, the gas combustion becomes increasingly dominating during the latter half of combustion. In this phase, all frequency content disappears as seen in 210c. Classical approaches of pressure ripple or knock spectral content become difficult to detect proximity to knock or uncontrolled combustion.

In the chart 210a, the example combustion stroke data set 212a is shown again. Based on the 0% GSR, an observation period 310a and an observation period 320a are identified. The observation period 310a represents a sub-portion of the combustion stroke, and is defined by a start offset 312a and an end offset 314a. The observation period 320a represents a sub-portion of the combustion stroke, and is defined by a start offset 322a and an end offset 324a. In the illustrated example, the start offset 312a, the end offset 314a, the start offset 322a, and/or the end offset 324a are offset from a predetermined start event, such as an offset in crank angle degrees from TDC. In some embodiments, the offsets can be relative to another predetermined crank position, or can be based on a time delay from TDC, fuel injection start time, fuel injection completion time, or any other predetermined combustion stroke start event. In some embodiments, the offsets can also be determined based upon engine RPMs, engine load, $O_2$ levels, altitude, fuel quality, temperature, or any other appropriate engine-operating variable.

The observation period 310a is identified (e.g., by the example controller 100 of FIG. 1) as a sub-portion of the combustion cycle, as represented by the combustion stroke data set 212a, in which vibrations due to abnormal diesel combustion (e.g., as opposed to knock-like vibrations caused by normal diesel combustion) are to be identified as true diesel knock. The observation period 320a is identified (e.g., by the example controller 100 of FIG. 1) as a sub-portion of the combustion cycle, as represented by the combustion stroke data set 212a, in which vibrations due to abnormal combustible gas combustion are to be identified as combustible gas knock.

For example, for 0% GSR, if "true" engine knock were to occur, it would be expected to happen during the observation period 310a but not during the observation period 320a. In use, a vibration that exceeds a predetermined amplitude and/or duration during the observation period 310a will be identified as abnormal combustion (e.g., knock), whereas a similar vibration duration during the observation period 320a may be ignored as normal diesel combustion.

In the chart 210b, the example combustion stroke data set 212b is shown again. Based on the 60% GSR, an observation period 310b and an observation period 320b are identified. The observation period 310b represents a sub-portion of the combustion stroke, and is defined by a start offset 312b and an end offset 314b. The observation period 320b represents a sub-portion of the combustion stroke, and is defined by a start offset 322b and an end offset 324b. In the illustrated example, the start offset 312b, the end offset 314b, the start offset 322b, and/or the end offset 324b are offset from a predetermined start event, such as an offset in crank angle degrees from TDC.

In some embodiments, the offsets can be relative to another predetermined crank position, or can be based on a time delay from TDC, fuel injection start time, fuel injection completion time, or any other predetermined combustion stroke start event. In some embodiments, the offsets can also be determined based upon engine RPMs, engine load, $O_2$ levels, altitude, fuel quality, temperature, or any other appropriate engine-operating variable. As shown in the illustrated example, the observation period 310b differs from the observation period 310a, and the observation period 320b differs from the observation period 320a, due to the different GSR and/or other operational differences in place during the capture of the example combustion stroke data set 212a and the example combustion stroke data set 212b.

The observation period 310b is identified (e.g., by the example controller 100 of FIG. 1) as a sub-portion of the combustion cycle, as represented by the combustion stroke data set 212b, in which vibrations due to abnormal diesel combustion (e.g., as opposed to knock-like vibrations caused by normal diesel combustion, or vibration caused by other portions of the engine or its operating environment) are to be identified as true diesel knock. The observation period 320b is identified (e.g., by the example controller 100 of FIG. 1) as a sub-portion of the combustion cycle, as represented by the combustion stroke data set 212b, in which vibrations due to abnormal combustible gas combustion are to be identified as combustible gas knock.

For example, for 60% GSR, if "true" engine knock were to occur due to diesel combustion, it would be expected to happen during the observation period 310b but not during the observation period 320b, and if "true" engine knock were to occur due to natural gas combustion, it would be expected to happen during the observation period 320b but not during the observation period 310b. In use, a vibration that exceeds a predetermined amplitude and/or duration during the observation period 310b will be identified as abnormal diesel combustion (e.g., knock), whereas a vibration that exceeds a predetermined amplitude and/or duration during the observation period 320b will be identified as abnormal natural gas combustion (e.g., knock).

In the chart 210c, the example combustion stroke data set 212b is shown again. Based on the 90% GSR, an observation period 310c and an observation period 320c are identified. The observation period 310c represents a sub-portion of the combustion stroke, and is defined by a start offset 312c and an end offset 314c. The observation period 320c represents a sub-portion of the combustion stroke, and is defined by a start offset 322c and an end offset 324c. In the illustrated example, the start offset 312c, the end offset 314c, the start offset 322c, and/or the end offset 324c are offset from a predetermined start event, such as an offset in crank angle degrees from TDC.

In some embodiments, the offsets can be relative to another predetermined crank position, or can be based on a time delay from TDC, fuel injection start time, fuel injection completion time, or any other predetermined combustion stroke start event. In some embodiments, the offsets can also be determined based upon engine RPMs, engine load, $O_2$ levels, altitude, fuel quality, temperature, or any other appropriate engine-operating variable. As shown in the illustrated example, the observation period 310c differs from the observation periods 310a and 310b, and the observation period 320c differs from the observation periods 320a and 320b, due to the different GSR and/or other operational differences in place during the capture of the example combustion stroke data sets 212a and 212b, and the example combustion stroke data set 212c.

The observation period 310c is identified (e.g., by the example controller 100 of FIG. 1) as a sub-portion of the combustion cycle, as represented by the combustion stroke data set 212c, in which vibrations due to abnormal diesel combustion (e.g., as opposed to knock-like vibrations caused by normal diesel combustion, or vibration caused by other portions of the engine or its operating environment) are to be identified as true diesel knock. The observation period 320c is identified (e.g., by the example controller 100 of FIG. 1) as a sub-portion of the combustion cycle, as represented by the combustion stroke data set 212c, in which vibrations due to abnormal combustible gas combustion are to be identified as combustible gas knock. For example, for 90% GSR, if "true" engine knock were to occur due to diesel combustion, it would be expected to happen during the observation period 310c but not during the observation period 320c, and if "true" engine knock were to occur due to natural gas combustion, it would be expected to happen during the observation period 320c but not during the observation period 310c. In use, a vibration that exceeds a predetermined amplitude and/or duration during the observation period 310c will be identified as abnormal diesel combustion (e.g., knock), whereas a vibration that exceeds a predetermined amplitude and/or duration during the observation period 320c will be identified as abnormal natural gas combustion (e.g., knock).

Figure 4:
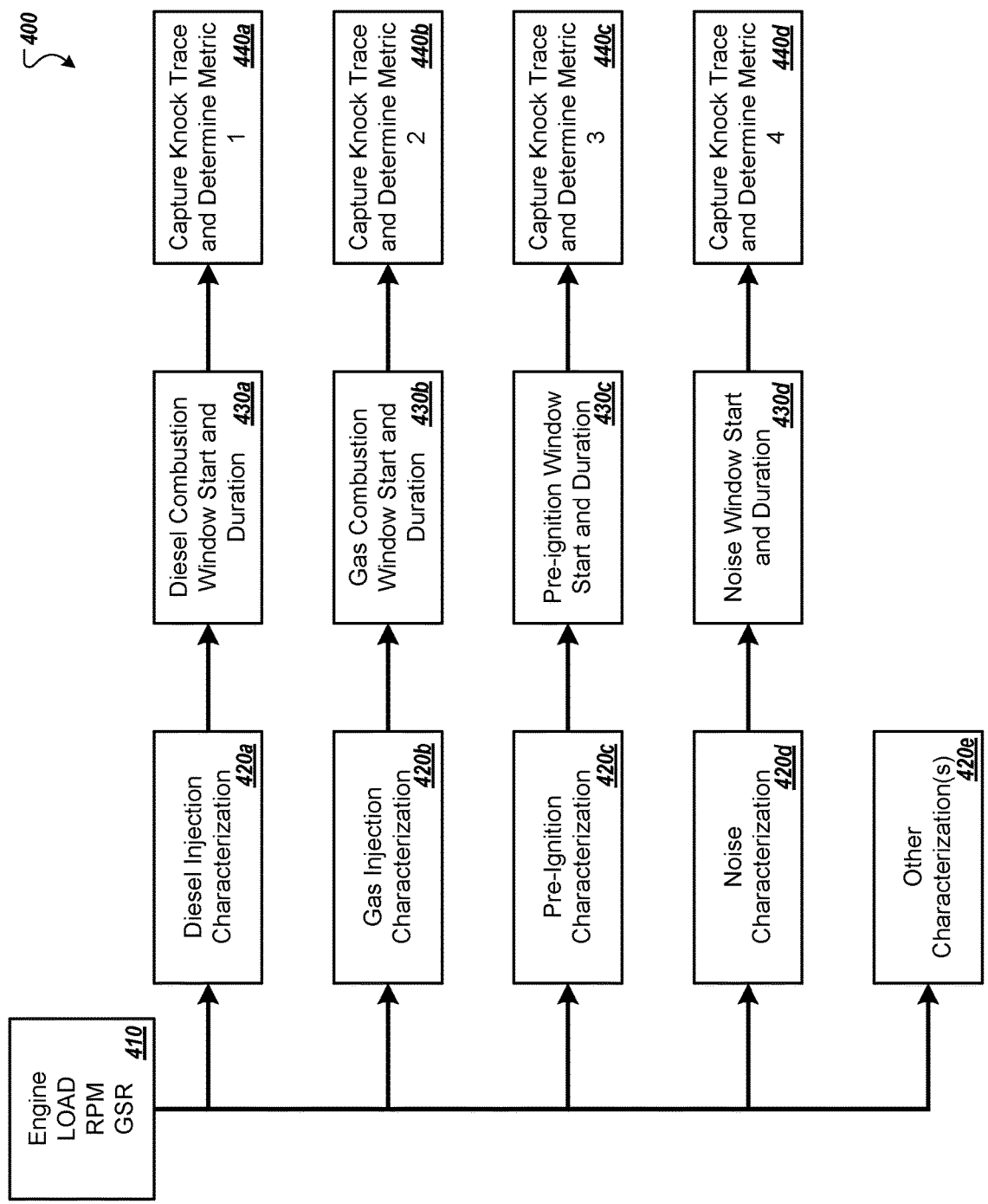
FIG. 4 is a block diagram of example inputs and outputs of an example knock detection process.

FIG. 4 is a block diagram of example inputs and outputs of an example knock detection process 400. In some implementations, the process 400 can be performed by the controller 100 of the example fluid admission system 10 of FIG. 1.

At 410, a collection of engine operational parameters for a dual-fuel engine are received. These engine parameters include engine load, engine RPMs, gas substitution ratio (GSR), temperature, compression, fuel quality (e.g., octane rating), elevation/altitude (O2), and/or any other appropriate combination of these and other appropriate parameters that can be used to describe the operational state of a dual-fuel engine.

In the process 400, several types of characterizations are performed based on the parameters of 410. At 420a, a diesel injection characterization is performed. In some implementations, the diesel characterization of 420a can include performing an algorithmic or table-based lookup of the effects of the parameters of 410 on diesel combustion. For example, the controller 100 can execute instructions that compute or look up information that predicts the combustive behavior of a fuel for the predetermined GSR, engine load, and/or engine RPMs.

At 430a, a diesel combustion window start and duration are identified. For example, the controller 100 can identify the example start offset 322b and the example end offset 324b of FIG. 3 based on an algorithmic or table look-up operation based on the predetermined GSR, engine load, and/or engine RPMs.

At 440a, knock trace information is captured, and a diesel knock metric is determined. For example, the combustion stroke data set 212b can be captured during the observation period 320b, and the controller 100 can process the combustion stroke data set 212b to determine if an abnormal combustion event occurred during the observation period 320b. In some implementations, the diesel knock metric can be an absolute value (e.g., true/false), a certainty value (e.g., 80% certain that a vibration was caused by knock), an amplitude value (e.g., a peak value to be compared against others), or any other appropriate form of measurement metric.

At 420b, a combustible gas injection characterization is performed. In some implementations, the combustible gas characterization of 420b can include performing an algorithmic or table-based lookup of the effects of the parameters of 410 on a combustible gas combustion. For example, the controller 100 can execute instructions that compute or look up information that predicts the combustive behavior of a fuel for the predetermined GSR, engine load, and/or engine RPMs.

At 430b, a combustible gas combustion window start and duration are identified. For example, the controller 100 can identify the example start offset 312b and the example end offset 314b of FIG. 3 based on an algorithmic or table look-up operation based on the predetermined GSR, engine load, and/or engine RPMs.

At 440b, knock trace information is captured, and a combustible gas knock metric is determined. For example, the combustion stroke data set 212b can be captured during the observation period 310*b*, and the controller 100 can process the combustion stroke data set 212*b* to determine if an abnormal combustion event occurred during the observation period 310*b*. In some implementations, the combustible gas knock metric can be an absolute value (e.g., true/false), a certainty value (e.g., 80% certain that a vibration was caused by knock), an amplitude value (e.g., a peak value to be compared against others), or any other appropriate form of measurement metric.

At 420*c*, a pre-ignition characterization is performed. In some implementations, the pre-ignition characterization of 420*c* can include performing an algorithmic or table-based lookup of the effects of the parameters of 410 on pre-ignition. For example, the controller 100 can execute instructions that compute or look up information that predicts the delay between the predetermined start event and the start of ignition for the predetermined GSR, engine load, and/or engine RPMs.

At 430*c*, a pre-ignition window start and duration are identified. For example, the controller 100 can identify another observation period (not shown) for FIG. 3 based on an algorithmic or table look-up operation based on the predetermined GSR, engine load, and/or engine RPMs. In some implementations, the pre-ignition window can define a sub-portion of the combustion stroke where neither diesel nor combustible gas combustion are expected to occur, such as between TDC and the start offset 312*b*.

At 440*c*, knock trace information is captured, and a pre-ignition gas knock metric is determined. For example, the combustion stroke data set 212*b* can be captured leading up to the observation period 310*b*, and the controller 100 can process the combustion stroke data set 212*b* to determine if an abnormal combustion event occurred prior to the observation period 310*b*. In some implementations, the pre-ignition knock metric can be an absolute value (e.g., true/false), a certainty value (e.g., 80% certain that a vibration was caused by knock), an amplitude value (e.g., a peak value to be compared against others), or any other appropriate form of measurement metric.

At 420*d*, a noise characterization is performed. In some implementations, the noise characterization of 420*d* can include performing an algorithmic or table-based lookup of the effects of the parameters of 410 on engine noise based on the predetermined GSR, engine load, and/or engine RPMs.

At 430*d*, a noise window start and duration are identified. For example, the controller 100 can identify another observation period (not shown) for FIG. 3 based on an algorithmic or table look-up operation based on the predetermined GSR, engine load, and/or engine RPMs. In some implementations, the noise window can define a sub-portion of the combustion stroke where neither diesel nor combustible gas combustion are expected to occur, such as prior to the start offset 312*b*, after the end offset 324*b*, and/or between combustion strokes.

At 440*c*, knock trace information is captured, and a noise metric is determined. For example, the combustion stroke data set 212*b* can be captured leading up to the observation period 310*b* and/or after the observation period 320*b*, and the controller 100 can process the combustion stroke data set 212*b* to determine a noise level. In some implementations, the noise metric can be an average, mean, peak, spectral, or any other appropriate form of noise measurement metric. In some implementations, the noise metric may be used to normalize the diesel metric, the combustible gas metric, and/or the pre-ignition metric. For example, the noise metric can be subtracted from the combustible gas metric (e.g., to remove a background noise component of the combustible gas metric), and the remaining value can be compared against a predetermined knock threshold value to determine if the remaining portion of the trace exceeds a predetermined threshold value for the identification of knock.

At 420*e*, one or more other characterizations are performed. In some implementations, the other characterizations of 420*e* can include performing an algorithmic or table-based lookup of the effects of the parameters of 410 on other engine operational characteristics based on the predetermined GSR, engine load, and/or engine RPMs.

Figure 5:
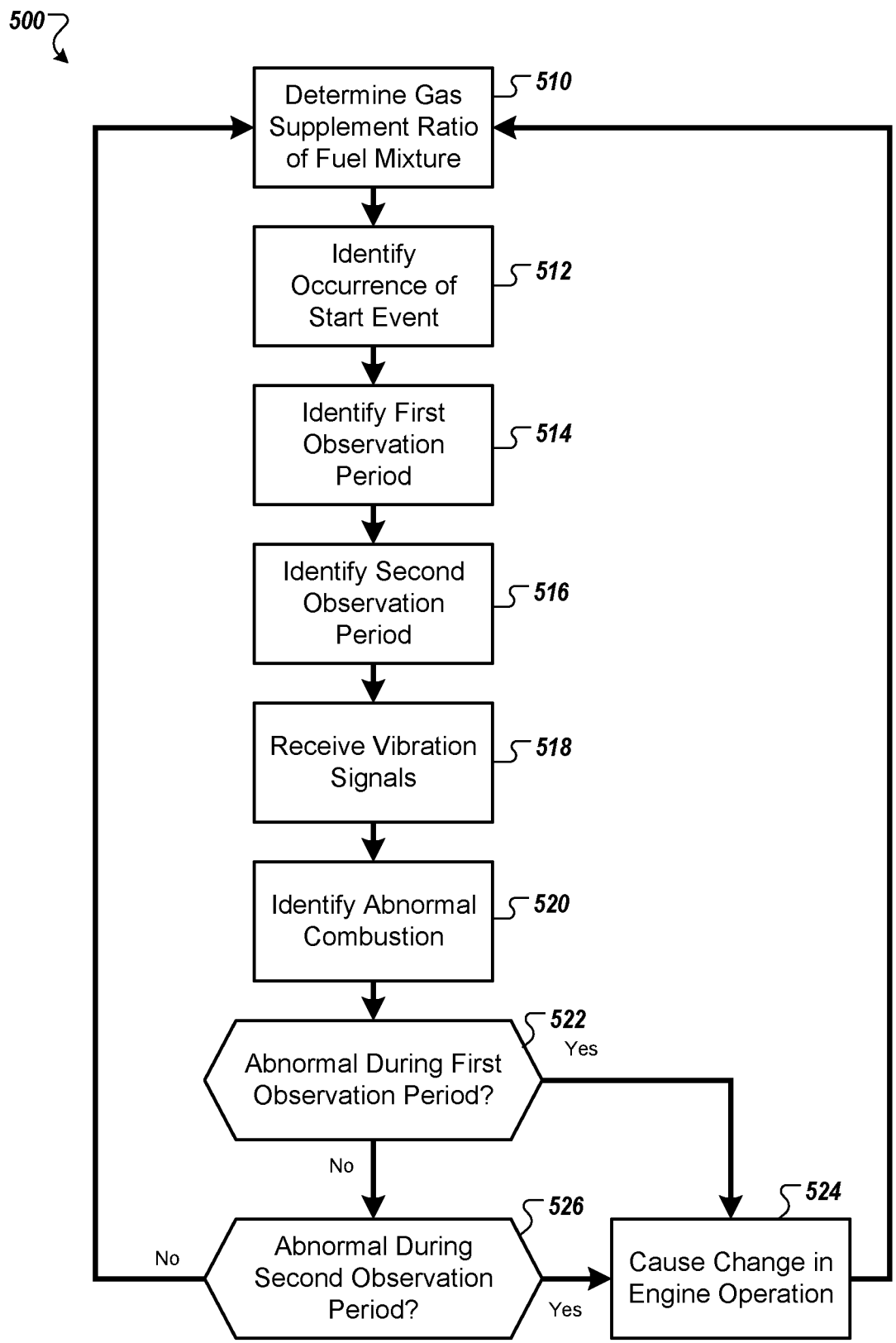
FIG. 5 is flow chart that shows an example of a process for knock detection.

FIG. 5 is flow chart that shows an example of a process 500 for knock detection. In some implementations, the process 500 can be performed by the controller 100 of the example fluid (e.g., fuel) admission system 10 of FIG. 1.

At 510, a gas supplement ratio (GSR) of a mixture of combustible natural gas and diesel fuel is determined. For example, the controller 100 can determine the GSR based on the configuration of the fluid admission valves 50 and 52. In another example, the controller 100 can determine the GSR based on information provided by a sensor configured to measure the GSR in the fuel conduit 41, or based on information provided by another appropriate source (e.g., a configuration setting).

At 512, the occurrence of a predetermined start event of a predetermined stroke of a piston of a selected combustion cylinder of the dual-fuel engine is identified. In some implementations, the predetermined start event can be based on a piston of the predetermined combustion cylinder reaching top dead center of a predetermined offset from top dead center. For example, the start event can be based on a sensed crank position (e.g., top dead center), and offset from TDC, or a fuel injection start time.

At 514, a first observation period (e.g., window) that is offset from the occurrence of the predetermined start event, based on the GSR, is identified. For example, the example observation period 310*b* of FIG. 3 can be identified by the controller 100. In some implementations, the first observation period can have a start that is offset from the predetermined start event by a first predetermined number of engine crank angle degrees and an end that is offset from the predetermined start event by a second predetermined number of engine crank angle degrees. In some implementations, the first observation period can have a start that is offset from the predetermined start event by a first predetermined amount of time and an end that is offset from the predetermined start event by a second predetermined amount of time.

At 516, a second observation period that is offset from the occurrence of the predetermined start event, based on the GSR, and at least partly non-overlapping from the first observation period is identified. For example, the example observation period 320*b* of FIG. 3 can be identified by the controller 100. In the illustrated example, the observation periods 310*b* and 320*b* are disjoint, but in other examples the observation periods 310*b* and 320*b* could at least partly overlap (e.g., at least partly non-disjoint). In some implementations, the second observation period can have a start that is offset from the predetermined start event by a third predetermined number of engine crank angle degrees and an end that is offset from the predetermined start event by a fourth predetermined number of engine crank angle degrees. In some implementations, the second observation period can have a start that is offset from the predetermined start event by a third predetermined amount of time and an end that is offset from the predetermined start event by a fourth predetermined amount of time.

In some implementations, at least one of identifying the first observation period and identifying the second observation period can include performing a table lookup, based on the GSR, on a table of predetermined observation period values. For example, the storage device 106 may include a preconfigured collection of expected or target engine operational parameters that can be identified by cross referencing combinations of the values for the GSR and the RPMs or engine load.

In some implementations, at least one of identifying the first observation period and identifying the second observation period can be based on the GSR and at least one of a determined engine load and a determined number of engine revolution speed. For example, the controller 100 can perform an algorithm to calculate the offsets of the first and/or second observation period using determined values for the GSR, the engine RPMs, and/or the engine load.

At 518, signals, provided by a vibration sensor, representative of vibration of the predetermined combustion cylinder during the compression stroke are received. For example, the vibration sensor 72 of the example fluid admission system 10 can sense vibration caused by operations (e.g., combustion) of the cylinder 12.

At 520, an abnormal combustion event is identified based on the signals. For example, the amplitude of a portion of the combustion stroke data set 212*b* can exceed a predetermined threshold value for amplitude and/or duration that is suggestive of an abnormal combustion event, such as engine knock.

At 522 a determination is made. If an abnormal combustion event is determined to have occurred during the first observation period, then at 524 operation of the dual-fuel engine is changed based determining that the abnormal combustion event occurred during the first observation period before the process 500 resumes at 510. For example, some diesel injectors may not be designed to operate well at very low injection rates. In such examples, when a high variation in combustion is detected during the observation period 310*b*, then an overly high GSR may be identified as causing the injector to malfunction, and the GSR may be reduced to cause diesel injection through the injector to increase and improve combustion.

If no abnormal combustion event is determined at 522, then at 526 another determination is made. If an abnormal combustion event is determined to have occurred during the second observation period, then at 524 operation of the dual-fuel engine is changed based determining that the abnormal combustion event occurred during the first observation period before the process 500 resumes at 510. For example, if a knock is detected during the observation period 320*b*, then the knock may be identified as combustible gas knock, and the engine RPMs may be reduced, the engine load may be reduced (e.g., switch to a lower gear), injection timing may be modified, the GSR may be lowered (e.g., by incremental amounts until gas knock is no longer detected), and/or combinations of these and any other appropriate remedy for natural gas engine knock may be implemented. In some implementations, conversely, if no gas knock is detected for a predetermined amount of time, then the controller 100 may modify engine operation to utilize a higher GSR, such as by incrementally increasing the GSR while no gas knock is detected.

In some implementations, the process 500 can also include providing at least one of a first indicator signal indicative of abnormal combustion of combustible natural gas, and a second indicator signal indicative of abnormal combustion of diesel fuel. For example, the controller 100 can provide an internally accessible and/or an externally accessible first signal when gas knock is detected, and provide an internally accessible and/or an externally accessible second signal when diesel knock is detected.

In some implementations, determining that the abnormal combustion event occurred during at least one of the first observation period and the second observation period can include at least one of determining, during the first observation period, that the abnormal combustion event occurred during the first observation period, and determining, during the second observation period, that the abnormal combustion event occurred during the second observation period. For example, the controller 100 can identify a knock event and perform steps in response before the observation period has elapsed (e.g., pseudo real-time monitoring and control of knock).

In some implementations, determining that the abnormal combustion event occurred during at least one of the first observation period and the second observation period can include at least one of determining the occurrence of the abnormal combustion event after the first observation period, that the abnormal combustion event occurred during the first observation period, and determining, after the second observation period, that the abnormal combustion event occurred during the second observation period. For example, the controller 100 can post-process vibration data after the observation periods have elapsed (e.g., not in real time) to identify knock, and then perform remedial steps in response to the identification.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method for acoustic detection of knock in a dual-fuel engine, comprising:
   determining a gas supplement ratio (GSR) of a mixture of combustible natural gas and diesel fuel;
   identifying an occurrence of a predetermined start event of a predetermined stroke of a piston of a selected combustion cylinder of the dual-fuel engine;
   identifying a first observation period that is offset from the occurrence of the predetermined start event, based on the GSR, the first observation period beginning after the predetermined start event, and the first observation period configured to occur during combustion of the diesel fuel in the combustion cylinder;
   identifying a second observation period that is offset from the occurrence of the predetermined start event, based on the GSR, and at least partly non-overlapping from the first observation period, the second observation period beginning after a beginning of the first observation period, the second observation period configured to occur during combustion of the natural gas in the combustion cylinder;
   identifying a noise observation period that is non-overlapping from the first observation period and the second observation period, based on the GSR, the noise observation period occurring separate from the combustion of the diesel fuel or the combustion of the natural gas and based on a background noise of the combustion cylinder; and determining a noise metric in the combustion cylinder based on the identified noise observation period;

receiving signals, provided by a vibration sensor, representative of vibration of the selected combustion cylinder during the predetermined stroke, wherein receiving signals representative of vibration of the selected combustion cylinder during the predetermined stroke comprises receiving signals during the identified noise observation period;

identifying an abnormal combustion event based on the signals;

determining that the abnormal combustion event occurred during at least one of the first observation period or the second observation period; and causing a change in operation of the dual-fuel engine based on determining that the abnormal combustion event occurred during at least one of the first observation period or the second observation period.

2. The method of claim 1, wherein the predetermined start event is based on a piston of the selected combustion cylinder reaching top dead center or a predetermined offset from top dead center.

3. The method of claim 2, wherein:
the first observation period has a start that is offset from the predetermined start event by a first predetermined number of engine crank angle degrees and an end that is offset from the predetermined start event by a second predetermined number of engine crank angle degrees; and
the second observation period has a start that is offset from the predetermined start event by a third predetermined number of engine crank angle degrees and an end that is offset from the predetermined start event by a fourth predetermined number of engine crank angle degrees.

4. The method of claim 2, wherein:
the first observation period has a start that is offset from the predetermined start event by a first predetermined amount of time and an end that is offset from the predetermined start event by a second predetermined amount of time; and
the second observation period has a start that is offset from the predetermined start event by a third predetermined amount of time and an end that is offset from the predetermined start event by a fourth predetermined amount of time.

5. The method of claim 1, further comprising providing at least one of a first indicator signal indicative of abnormal combustion of combustible natural gas or a second indicator signal indicative of abnormal combustion of diesel fuel.

6. The method of claim 1, wherein determining that the abnormal combustion event occurred during at least one of the first observation period or the second observation period further comprises at least one of determining, during the first observation period, that the abnormal combustion event occurred during the first observation period, or determining, during the second observation period, that the abnormal combustion event occurred during the second observation period.

7. The method of claim 1, wherein determining that the abnormal combustion event occurred during at least one of the first observation period or the second observation period further comprises at least one of determining occurrence of the abnormal combustion event after the first observation period, that the abnormal combustion event occurred during the first observation period, or determining, after the second observation period, that the abnormal combustion event occurred during the second observation period.

8. The method of claim 1, wherein at least one of identifying the first observation period or identifying the second observation period further comprises performing a table lookup, based on the GSR, on a table of predetermined observation period values.

9. The method of claim 1, wherein at least one of identifying the first observation period or identifying the second observation period is based on the GSR and at least one of a determined engine load or a determined engine speed.

10. An acoustic knock detection system, comprising:
a vibration sensor;
a data processing apparatus; and
a computer memory storage device storing instructions executable by a computer device and that upon such execution cause the computer device to perform operations comprising:
determining a gas supplement ratio (GSR) of a mixture of combustible natural gas and diesel fuel;
identifying an occurrence of a predetermined start event of a predetermined stroke of a piston of a selected combustion cylinder of a dual-fuel engine;
identifying a first observation period that is offset from the occurrence of the predetermined start event, based on the GSR, the first observation period beginning after the predetermined start event, and the first observation period configured to occur during combustion of the diesel fuel in the combustion cylinder;
identifying a second observation period that is offset from the occurrence of the predetermined start event, based on the GSR, and at least partly non-overlapping from the first observation period, the second observation period beginning after a beginning of the first observation period, the second observation period configured to occur during combustion of the natural gas in the combustion cylinder;
identifying a noise observation period that is non-overlapping from the first observation period and the second observation period, based on the GSR, the noise observation period occurring separate from the combustion of the diesel fuel or the combustion of the natural gas and based on a background noise of the combustion cylinder; and
determining a noise metric in the combustion cylinder based on the identified noise observation period;
receiving signals, provided by the vibration sensor, representative of vibration of the selected combustion cylinder of the dual-fuel engine during the predetermined stroke wherein receiving signals representative of vibration of the selected combustion cylinder during the predetermined stroke comprises receiving signals during the identified noise observation period;
identifying an abnormal combustion event based on the signals;
determining that the abnormal combustion event occurred during at least one of the first observation period or the second observation period; and
causing a change in operation of the dual-fuel engine based on determining that the abnormal combustion event occurred during at least one of the first observation period or the second observation period.

11. The acoustic knock detection system of claim 10, further comprising the dual-fuel engine.

12. The acoustic knock detection system of claim 10, further comprising a second vibration sensor, wherein the operations further comprise:
- identifying an occurrence of a second predetermined start event of a predetermined stroke of a second piston of a second selected combustion cylinder of the dual-fuel engine;
- identifying a third observation period that is offset from the occurrence of the second predetermined start event, based on the GSR;
- identifying a fourth observation period that is offset from the occurrence of the second predetermined start event, based on the GSR, and at least partly non-overlapping from the third observation period;
- receiving second signals, provided by the second vibration sensor, representative of vibration of the second selected combustion cylinder of the dual-fuel engine during the predetermined stroke;
- identifying a second abnormal combustion event based on the second signals;
- determining that the second abnormal combustion event occurred during at least one of the third observation period or the fourth observation period; and
- causing a second change in the operation of the dual-fuel engine based determining that the second abnormal combustion event occurred during at least one of the third observation period or the fourth observation period.

13. The acoustic knock detection system of claim 10, wherein the predetermined start event is based on a piston of the selected combustion cylinder reaching top dead center or a predetermined offset from top dead center.

14. The acoustic knock detection system of claim 13, wherein:
- the first observation period has a start that is offset from the predetermined start event by a first predetermined number of engine crank angle degrees and an end that is offset from the predetermined start event by a second predetermined number of engine crank angle degrees; and
- the second observation period has a start that is offset from the predetermined start event by a third predetermined number of engine crank angle degrees and an end that is offset from the predetermined start event by a fourth predetermined number of engine crank angle degrees.

15. The acoustic knock detection system of claim 13, wherein:
- the first observation period has a start that is offset from the predetermined start event by a first predetermined amount of time and an end that is offset from the predetermined start event by a second predetermined amount of time; and
- the second observation period has a start that is offset from the predetermined start event by a third predetermined amount of time and an end that is offset from the predetermined start event by a fourth predetermined amount of time.

16. The acoustic knock detection system of claim 10, the operations further comprising providing at least one of a first indicator signal indicative of abnormal combustion of combustible natural gas or a second indicator signal indicative of abnormal combustion of diesel fuel.

17. The acoustic knock detection system of claim 10, wherein determining that the abnormal combustion event occurred during at least one of the first observation period or the second observation period further comprises at least one of determining, during the first observation period, that the abnormal combustion event occurred during the first observation period, or determining, during the second observation period, that the abnormal combustion event occurred during the second observation period.

18. The acoustic knock detection system of claim 10, wherein determining that the abnormal combustion event occurred during at least one of the first observation period or the second observation period further comprises at least one of determining the occurrence of the abnormal combustion event after the first observation period, that the abnormal combustion event occurred during the first observation period, or determining, after the second observation period, that the abnormal combustion event occurred during the second observation period.

19. The acoustic knock detection system of claim 10, wherein at least one of identifying the first observation period or identifying the second observation period further comprises performing a table lookup, based on the GSR, on a table of predetermined observation period values.

20. The acoustic knock detection system of claim 10, wherein at least one of identifying the first observation period or identifying the second observation period is based on the GSR and at least one of a determined engine load or a determined engine speed.

* * * * *